(12) United States Patent
Pistone et al.

(10) Patent No.: US 11,920,054 B1
(45) Date of Patent: Mar. 5, 2024

(54) REACTIVE EXTRUSION OF HYDROPHOBICALLY MODIFIED URETHANE THICKENERS AND METHODS OF MANUFACTURING THE SAME

(71) Applicant: SWIMC LLC, Cleveland, OH (US)

(72) Inventors: Vito J. Pistone, Cleveland, OH (US); Randolph B. Krafcik, Cleveland, OH (US)

(73) Assignee: SWIMC LLC, Cleveland, OH (US)

( * ) Notice: Subject to any disclaimer, the term of this patent is extended or adjusted under 35 U.S.C. 154(b) by 514 days.

(21) Appl. No.: 15/929,264

(22) Filed: Apr. 20, 2020

Related U.S. Application Data

(60) Provisional application No. 62/837,230, filed on Apr. 23, 2019.

(51) Int. Cl.
| | | |
|---|---|---|
| *C08G 18/48* | (2006.01) | |
| *C08G 18/24* | (2006.01) | |
| *C08G 18/28* | (2006.01) | |
| *C08G 18/75* | (2006.01) | |
| *C09D 175/08* | (2006.01) | |

(52) U.S. Cl.
CPC ......... *C09D 175/08* (2013.01); *C08G 18/246* (2013.01); *C08G 18/2825* (2013.01); *C08G 18/4833* (2013.01); *C08G 18/758* (2013.01); *C08G 2150/00* (2013.01)

(58) Field of Classification Search
CPC .............. C08G 18/282–2835; C08G 18/4833
See application file for complete search history.

(56) References Cited

U.S. PATENT DOCUMENTS

| | | | | |
|---|---|---|---|---|
| 5,973,063 A | * | 10/1999 | Doolan | C08G 18/12 |
| | | | | 524/591 |
| 6,316,540 B1 | | 11/2001 | Krafcik et al. | |
| 2015/0112000 A1 | * | 4/2015 | Bhargava | C09D 7/43 |
| | | | | 524/58 |
| 2021/0269580 A1 | * | 9/2021 | Magny | C08L 75/08 |

OTHER PUBLICATIONS

Definition of alkyl groups. IUPAC Compendium of Chemical Terminology. 2014 (Year: 2014).*
Definition of alkylene groups. IUPAC Compendium of Chemical Terminology. 2014 (Year: 2014).*
Application FR1859946. Filed Oct. 26, 2018. (Year: 2018).*
Machine Translation of FR1859946. Filed Oct. 26, 2018. (Year: 2018).*
AxisPharm. Difference between PEG (Polydisperse PEG) and Monodisperse PEG. https://axispharm.com/difference-between-polymer-peg-polydisperse-peg-and-monodisperse-peg/. As viewed on Mar. 15, 2023. (Year: 2023).*
Anonymous. Processing Associative Thickeners in a High Volume Kneading Reactor. Research Disclosure database No. 655009. Published Sep. 27, 2018. (Year: 2018).*

* cited by examiner

*Primary Examiner* — Stephen E Rieth

(57) ABSTRACT

Solvent-free, hydrophobically modified urethane (HEURs) compositions produced by reactive extrusion, methods of producing the same, and coating compositions containing the same are described. Such HEURs can be used as solvent-free or low-solvent rheology modifiers in coatings formulations. The HEURs compositions herein are formed by reactive extrusion of a polyether polyol and an isocyanate functional material in the presence of a metal catalyst, and an hydrophobic, end-capping modifier without the need for organic solvents, co-solvents, and/or surfactants. In certain aspects, compositions and methods herein do not require the costly stripping of organic solvent to provide useable product, allow for a 100% active solids HEUR that can be added directly to the grind stage of making a paint composition, and are free of VOC-contributing solvents or co-solvent.

6 Claims, 3 Drawing Sheets

| Motor | Zone 1 | Zone 2 | Zone 3 | Zone 4 | Zone 5 | Zone 6 | Zone 7 | Zone 8 | Zone 9 | Zone 10 | Die |
|---|---|---|---|---|---|---|---|---|---|---|---|
| Temp. (°C) | 80 | 120 | 110 | 110 | 110 | 100 | 100 | 100 | 100 | 100 | 100 |
| Zone Function | Convey | Convey | Convey | Convey | 30°KB | Convey | 30°KB | Convey | Convey | Convey | N/A |
| Feed | PEG-8000 | | | | Des-W & DBTDL | | Alfol-6 | | | | |

FIG. 1A

| Motor | Zone 1 | Zone 2 | Zone 3 | Zone 4 | Zone 5 | Zone 6 | Zone 7 | Zone 8 | Zone 9 | Zone 10 | Die |
|---|---|---|---|---|---|---|---|---|---|---|---|
| Temp. (°C) | 80 | 120 | 110 | 110 | 110 | 100 | 100 | 100 | 100 | 100 | 100 |
| Zone Function | Convey | Convey | Convey | Convey | 30°KB | Convey | Convey | Convey | 30°KB | Convey | N/A |
| Feed | PEG-8000 | | | | Des-W & DBTDL | | | | Alfol-6 | | |

FIG. 1B

| Motor | Zone 1 | Zone 2 | Zone 3 | Zone 4 | Zone 5 | Zone 6 | Zone 7 | Zone 8 | Zone 9 | Zone 10 | Die |
|---|---|---|---|---|---|---|---|---|---|---|---|
| Temp. (°C) | 110 | 110 | 110 | 110 | 110 | 110 | 105 | 105 | 110 | 105 | 105 |
| Zone Function | Convey | Convey | Convey | Convey | 30°KB | Convey | 30°KB | Convey | Convey | Convey | N/A |
| Feed | PEG-8000 | | | | Des-W & DBTDL | | Alfol-6 | | | | |

FIG. 1C

REACTIVE EXTRUSION OF HYDROPHOBICALLY MODIFIED URETHANE THICKENERS AND METHODS OF MANUFACTURING THE SAME

FIELD

This application generally relates to hydrophobically modified urethanes produced by reactive extrusion, methods of producing the same, and coating compositions containing the same. More specifically, such urethanes can be used as solvent-free or low-solvent rheology modifiers in coatings formulations.

BACKGROUND

Associating polymers have long been used in the coatings industry their applications as viscosity enhancers. There are many systems, solutions (or melts) of associating polymers which can be simultaneously shear thickening and shear thinning, one or the other depending on the shear rate window that is explored. One example of the associating polymers is thermoplastic polyurethane ("TPU") consisting of a water-soluble chain containing at least two short sequences of hydrophobic monomers. In aqueous solutions, the short hydrophobic segments tend to segregate, forming an inner core of micelles with loops of the longer hydrophilic chain segments extending into the water. In dilute solutions the morphology is that of isolated micelles. With increasing concentration, some chains may bridge from one micelle to the next. Eventually, as concentration increases, the system becomes a well dispersed network.

Examples of associating polymers include hydrophobically modified ethoxylated urethanes ("HEUR") with hydrophobic end caps capable of reacting with an isocyanate consisting of monofunctional aliphatic alcohols, alkyl phenols, aliphatic amines, alkyl anilines, or fluorocarbons. In aqueous solution, the hydrophobic end groups of a HEUR clump together to form nodular "micelles" containing several end groups affecting the solution viscosity.

HEURs have been widely used as thickening agents in commercial paints. In the presence of paint formulation the hydrophobic ends associate predominately with the latex particles. Paints formulated using these components have been found to spatter less when rolled onto surfaces in addition to gaining other favorable rheology properties. Further viscosity enhancement and rheology modulation, even at a low concentration of HEUR, is achieved by the addition of surfactant, latex particles and pigments in appropriate amounts.

Conventional synthesis of HEUR thickeners requires the use of a solvent to manufacture. (See U.S. Pat. No. 6,316, 540 at col. 4, ll. 54-66). A typical HEUR synthesis involves the initial formation of a prepolymer via the reaction of a polyethylene oxide with an isocyanate functional material to form an isocyanate-terminated prepolymer. The prepolymer may then be reacted with a hydrophobic mono alcohol to form the HEUR thickener. Because the reactants are hygroscopic and the presence of water in the initial stage reaction will result in unwanted side reactions that form urea, the two-step process is run, conventionally, in an organic solvent (e.g., xylene) and under nitrogen either by pumping the reactants and these additional components in solution through static mixers or combining the reactants and additional components in a standard batch reactor. In the conventional production method, this necessary step results in a product that may not be added directly to a latex paint formulation because of the presence of undesirable organic solvent (e.g. xylene).

Conventional processing of reaction products before addition to a paint formulation requires stripping or separation of solvent from the system and solvation with water for compatibility with a latex. This is accomplished by the addition of water and water-soluble cosolvents (e.g. butyl carbitol) to the product/organic solvent system, followed by distillation and separation until substantially small levels of organic solvent (in the case of xylene, below 1% by weight) remain. (See U.S. Pat. No. 6,316,540 at col. 5, ll. 1-13 referring to "azeotropic removal" of solvent in formation of a prepolymer and again at col. 5, ll. 38-41 referring to removal of solvent after a final reaction step is complete). Solvent removal steps are rate limiting and make production longer and more costly and further necessitate the disadvantages of production using an organic solvent and cosolvents. Leftover solvent and cosolvents may further contribute unfavorably to VOC content.

SUMMARY

The present disclosure describes solvent-free HEURs produced by reactive extrusion and methods of producing the same. The claimed methods provide for reaction of the HEURs reactants in 100% solid form, thus eliminating the need for the use of organic solvent in production, removal of organic solvent following production, remaining organic solvent even after removal due to azeotropic properties, and solvation in water using cosolvents following production. The claimed methods and compositions allow for a 100% active solids HEUR product that can be added directly to the grind stage of making a paint composition, or can easily be solvated in water without cosolvents for transport or alternate addition in a paint or coating.

In one aspect, the solvent-free HEURs are produced by reactive extrusion, wherein three feeds are applied to a continuous reaction assembly or a reactive extruder. In certain embodiments the first and second feeds comprise a polyether polyol and an isocyanate functional material, respectively. Either the first feed, the second feed, or both feeds also contain a catalyst for facilitating reaction between the polyether polyol and the isocyanate functional material. The first and second feeds enter the reaction assembly Upstream of the third feed, though the first feed and second feed need not enter the reaction assembly in a particular order relative to one another. The polyether polyol must melt prior to entering or can melt inside of the reactive extruder for a reaction between the polyether polyol and isocyanate functional material to proceed. The reaction produces a prepolymer that then reacts with a third feed. The third feed comprises a hydrophobic modifier. The hydrophobic modifier can be comprised of aliphatic alcohols, alkyl phenols, aliphatic amines, alkyl anilines, or mixtures thereof that end-cap the prepolymer to form a solvent-free HEUR.

In certain embodiments, the continuous reaction assembly is a twin-screw, co-rotating, intermeshing extruder with alternating temperature control of different zones of the extruder.

In other embodiments, the extruder further comprises kneading blocks that facilitate mixing and apply shear to reaction components.

In one aspect, a solvent-free HEUR is cooled following extrusion to form a solid HEUR and the solid HEUR is ground to a powder. In certain embodiments, the powder may be directly added to the grind stage of making a paint composition to provide rheology modification. In other embodiments, the powder may be solvated with water and co-solvents and/or surfactants to form an aqueous solution.

In another aspect, a coating incorporating a rheology-modifying HEUR is produced without the need for using a solvent in the production of the HEUR.

In another aspect, the rheology-modifying HEUR has a lower VOC than the same HEUR produced by conventional methods.

BRIEF DESCRIPTION OF DRAWINGS

FIGS. 1A-1C are schematic representations of exemplary HEUR production arrangements for an extruder.

DETAILED DESCRIPTION

A hydrophobically modified urethane ("HEUR") rheology modifier/thickener and methods of producing the same are described. To form the HEUR thickener, separate feeds comprising a polyether polyol feed, an isocyanate functional material feed, and a hydrophobic modifier feed are fed to into a continuous reaction assembly to ultimately yield a solvent-free HEUR thickener. In some embodiments a catalyst is added in a separate feed or in one or both of the polyether polyol or isocyanate feeds to facilitate reaction between the polyether polyols and isocyanates. No solvent need be included in these feeds and thus a 100% solid reactant system can be attained with a lower VOC than with the conventional method.

A principle of the inventive process and resultant HEURs is that a first stage reaction of the polyether polyol and isocyanate functional material resulting in a prepolymer and a second stage reaction of the prepolymer and hydrophobic modifier reactants take place continuously, in a continuous reaction assembly, which may be selected from the group consisting of an extruder, flow tube, intensive kneader, or intensive mixer with supply of heat and combinations thereof. "Continuous reaction assembly," as used herein, may refer in certain embodiments to two or more of the listed assemblies to be combined such that an intermediate product from one assembly is fed into another assembly and then further reacted with an additional feed. In varying embodiments, the polyether polyol, isocyanate functional material, and hydrophobic modifier feeds are thus fed into one of the listed continuous reaction assemblies. The residence time of the reactants across the abovementioned assemblies can be seconds to 15 minutes, 1 minute to 10 minutes, 2 to 7 minutes, 3 to 6 minutes, 4 to 5 minutes, about 5 minutes, about 2 minutes, and any subranges of those time periods.

The polyether polyol may generally be composed of monomers that form a hydrophilic chain when polymerized and are capable of reacting with isocyanate to form a urethane linkage. In certain embodiments, the weight average molecular weight of the polyether polyol is 1,000 to 32,000. In certain embodiments, the polyether polyol is polyethylene oxide or any polymer with polyol hydroxyl functionality or mixtures thereof.

The polyether polyol is preferably a polyalkylene oxide such as polyethylene glycol. Suitable materials include the adducts of an aliphatic, cycloaliphatic or aromatic polyhydroxy compound such as a polyhydric alcohol or polyhydric alcohol ether and an alkylene oxide such as ethylene oxide or propylene oxide. Or, they may be hydroxyl-terminated prepolymers of such adducts and an organic polyisocyanate. Mixtures of two or more such materials are also acceptable.

Polyhydric alcohols include not only the simple glycols such as ethylene glycol, polyethylene glycol, propylene glycol and polypropylene glycol, but also hydroxy compounds having three or more hydroxyl groups such as polyalkylolalkanes (e.g. trimethylolpropane, pentaerythritol) and polyhydroxyalkanes (e.g. glycerol, erythritol, sorbitol, mannitol, and the like).

In some embodiments, the weight average molecular weight of a polyethylene oxide in the polyether polyol feed is 1,000 to 32,000. In some embodiments the weight average molecular weight of the polyethylene oxide is 2,000 to 25,000. In further embodiments the weight average molecular weight of the polyethylene oxide is 3,000 to 15,000. In further embodiments the weight average molecular weight of the polyethylene oxide is 5,000 to 10,000. In still further embodiments the weight average molecular weight of the polyethylene oxide is about 8,000. In certain embodiments, the polyether polyol feed is comprised of polyethylene glycol. In certain embodiments, the polyether polyol feed is comprised of polyethylene glycol and a catalyst, wherein the catalyst may be a metal catalyst. In certain embodiments, the metal catalyst is dibutyltin dilaurate.

The isocyanate functional material can be aliphatic, cycloaliphatic or aromatic, and may be used singly or in combination with other isocyanate functional materials. The isocyanate functional material should have at least two or more reactive isocyanate groups. Exemplary diisocyanates include the aliphatic, cycloaliphatic and aromatic diisocyanates either alone or in admixture. Generally, such diisocyanates have the formula OCN—R—NCO where R is arylene (e.g. phenylene and diphenylene), alkylarylene (e.g. dimethylbiphenylene, methylenebisphenyl and dimethylmethylenebisphenylene), alkylene (e.g. methylene, ethylene, tetramethylene, hexamethylene, a 36 methylene species, and trimethylhexylene), and/or cyclic (e.g. isophorone and methylcyclohexylene). Or, R can be a hydrocarbon group containing ester or ether linkages. Specific examples of such diisocyanates include 1,4-tetramethylene diisocyanate, 1,6-hexamethylene diisocyanate (trade name: Desmodur-H®), 2,2,4-trimethyl-1,6-diisocyanato hexane, 1,10-decamethylene diisocyanate, 1,4-cyclohexylene diisocyanate, 4,4'-methylene bis(isocyanato cyclohexane), p-phenylene diisocyanate, 2,6-toluene diisocyanate, 2,4-toluene diisocyanate, xylene diisocyanate, isophorone diisocyanate, bis para-isocyanato cyclohexylmethane, 4,4-biphenylene diisocyanate, 4,4-methylene diphenyl isocyanate, 1,5-naphthalene diisocyanate, benzene 1,3-bis (1-isocyanato-1-methylethyl) and 1,5-tetrahydronaphthalene diisocyanate. If producing a branched composition, suitable triisocyanates include aromatic triisocyanate adduct of trimethylol propane and tolylene diisocyanate sold under the brand name Mondur CB-75, and aliphatic triisocyanate product of the hydrolytic trimerization of 1,6-hexamethylene diisocyanate, sold under the brand name Desmodur N®.

Most preferred are dicyclohexylmethane-4,4'-diisocyanate sold under the brand name Desmodur-W®, isophorone diisocyanate, diphenylmethane-4,4'-diisocyanate sold under the brand name Mondur XP744® and isocyanurate trimer of hexamethylene diisocyanate sold under the brand name Desmodur N-3300®.

In certain embodiments, the isocyanate functional material feed comprises a diisocyanate and a catalyst. In certain embodiments, the diisocyanate is 4,4-dicyclohexamethane diisocyanate (trade name: Desmodur-W®). In certain embodiments, the catalyst is dibutyltin dilaurate.

The polyether polyol feed may be introduced into a continuous reaction assembly in solid flake form or in a hot melt feed. The polyether polyol feed and isocyanate functional material feed need not be in any particular Upstream or Downstream order from one another when fed to the continuous reaction assembly. These feeds should be added upstream of the hydrophobic modifier feed with sufficient spacing and residence time to allow the polyether polyol and isocyanate functional material to react in an initial reaction that forms a prepolymer via a condensation. In certain exemplary embodiments, substantially all of the polyether polyol has fully reacted with the isocyanate functional material by the time the continuous reaction assembly mix reaches the Downstream hydrophobic modifier feed. In certain embodiments, the prepolymer formed is a urethane-terminated polyethylene oxide with diisocyanate having reacted with either terminal end of a linear, polyethylene oxide chain. An example prepolymer condensation reaction, incorporating exemplary reactants, is shown below:

chain. In certain embodiments, the monofunctional, hydrophobic end-capping material may be $C_4$-$C_{20}$ in chain length and may be a linear or a branched chain monofunctional alcohol. In certain embodiments, the monofunctional alcohol is 1-hexanol.

In certain embodiments, the monofunctional, hydrophobic end-capping material is a mono-functional amine, wherein the amino group is positioned at or near the ends of the amine chain. Some acceptable amines include 1-aminobutane, 1-aminopentane, 1-aminohexane, 1-aminoheptane, 1-aminooctane, 1-aminononane, 1-aminodecane, 1-aminododecane, 4-aminodicyclohexylmethane and mixtures thereof.

Also suitable for use as the hydrophobic modifier are monofunctional thiols, carboxylic acids and epoxies having functionality at or near the end of their respective chains. For example, useful thiols include 1-butanethiol, 1-pentanethiol,

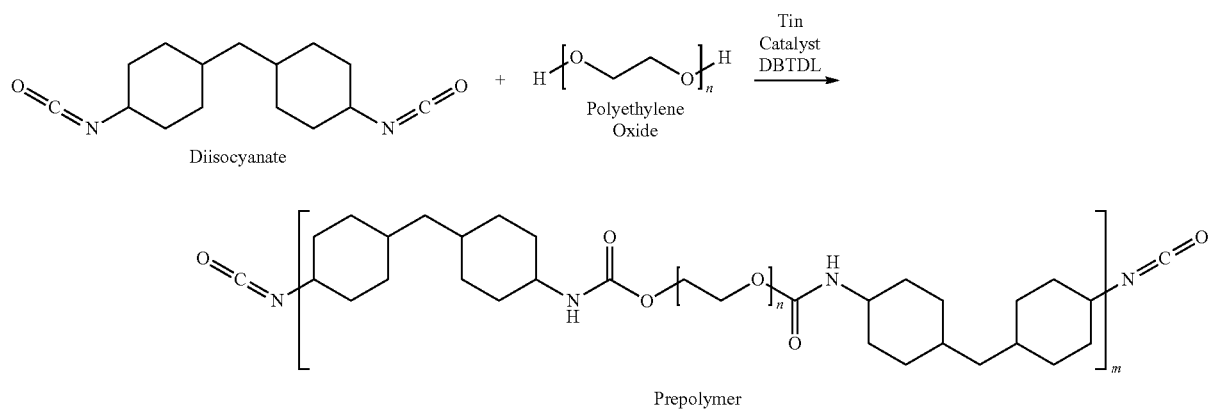

where the exemplary diisocyanate is 4,4-dicyclohexamethane diisocyanate, the exemplary polyethylene oxide is a polyethylene glycol, the exemplary prepolymer is the full condensation of the diisocyanate and the polyethylene oxide, and the exemplary tin catalyst is dibutyltin dilaurate.

In the continuous reaction assembly, this prepolymer formation reaction proceeds entirely without organic solvent, contrary to in a traditional, batch reactor or static mixer system. The isocyanate functional material and polyether polyol feeds are fed solvent free, in 100% solid or hot melt form into the continuous reaction assembly.

In some embodiments a catalyst is added in a separate feed or in one or both of the polyether polyol or isocyanate feeds to facilitate reaction between the polyether polyols and isocyanates. The catalyst may be a metal catalyst or an amine catalyst. Some exemplary catalysts include dibutyltin dilaurate (DBTDL), 1,4-diazabicyclo (2-, 2-, 2-)octane (DABCO, available from Evonik), and K-KAT bismuth catalysts (product line available from King Industries). The catalyst may be present by mol % of all feeds to the continuous reaction assembly in an amount ranging from 0.01 to 2 mol %, 0.1 to 1.9 mol %, 0.25 to 1.5 mol %, or 0.3 to 1.2 mol %. The catalyst may also preferably be present in an amount of 0.50 mol %.

The hydrophobic modifier feed is a monofunctional, hydrophobic end-capping material that is reactive with isocyanate groups, and may be used singly or in combination with other hydrophobic end-capping materials (blends). It is preferably a linear, monofunctional alcohol wherein the hydroxyl group is positioned at or near an end of the alcohol 1-hexanethiol, 1-heptanethiol, 1-octanethiol, 1-nonanethiol and 1-decanethiol. Useful carboxylic acids include 1-butanecarboxylic acid, 1-pentanecarboxylic acid, 1-hexanecarboxylic acid, 1-heptanecarboxylic acid, 1-octanecarboxylic acid, 1-nonanecarboxylic acid and 1-decanecarboxylic acid. Useful epoxy compounds include 1-butanol glycidyl ether, 1-pentanol glycidyl ether, 1-hexanol glycidyl ether, 1-heptanol glycidyl ether, 1-octanol glycidyl ether, 1-nonanol glycidal ether, 1-decanol glycidal ether and phenol epoxide.

The hydrophobic modifier feed joins the reaction mix Downstream from the polyether polyol and isocyanate functional material feeds. The hydrophobic modifier reacts with the prepolymer formed in the initial polyether polyol/isocyanate functional material condensation to endcap the prepolymer, yielding a HEUR rheology modifier. In certain exemplary embodiments, sufficient residence time is provided between the hydrophobic modifier feed and the polyether polyol and isocyanate functional material feeds, and appropriate continuous reaction assembly conditions are maintained such that substantially all of the polyether polyol and/or substantially all of the isocyanate functional material have been converted to prepolymer by the time the reaction mix reaches the hydrophobic modifier feed. Residence times between initial feed of the polyether polyol and isocyanate functional material feeds and the hydrophobic modifier feed will naturally be shorter than the overall residence time through the continuous reaction assembly.

An example hydrophobic modifier endcapping reaction, incorporating exemplary reactants, is shown below:

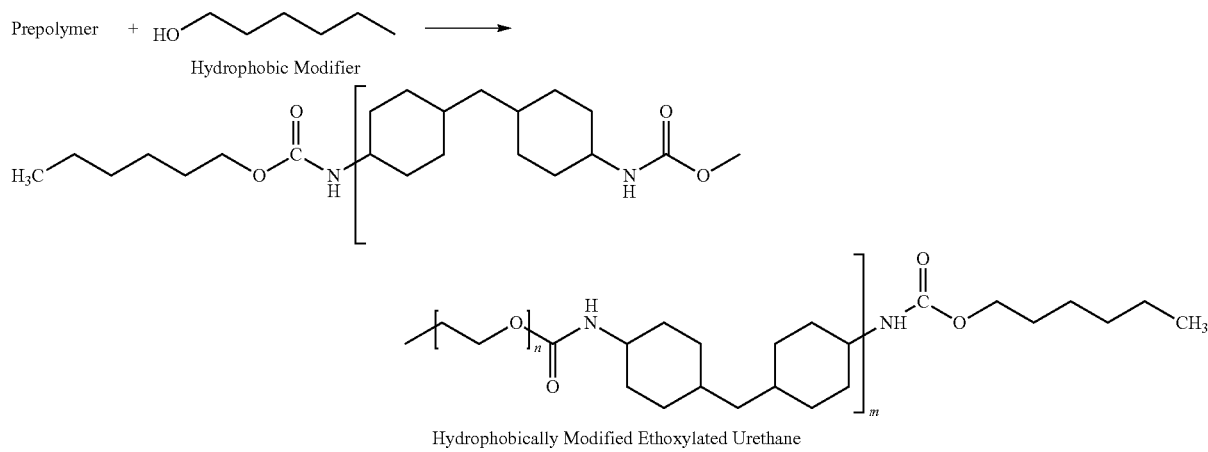

wherein the exemplary prepolymer is the prepolymer formed in the initial, isocyanate functional material/polyether polyol condensation reaction, the hydrophobic modifier is 1-hexanol, and the exemplary hydrophobically urethane is the HEUR reaction product of the exemplary prepolymer and the 1-hexanol.

In the continuous reaction assembly, as with the initial, prepolymer formation/condensation reaction, this endcapping reaction proceeds entirely without organic solvent, again contrary to in a traditional, batch reactor system. The hydrophobic modifier feed is fed solvent free, in 100% solid, 100% liquid, or hot melt form into the continuous reaction assembly.

In exemplary embodiments, the resulting HEUR product is cooled to a solid and then ground into particles that may be about 50 to 2000 microns in size. In certain embodiments, the particles are solvated with water and water-soluble cosolvents. In certain embodiments the HEUR particles are present in water at about 15% to 50% by weight, preferably 20% to 25% by weight. This solvent can then be added to paint and coatings formulations as a rheology modifier. Alternatively, in other embodiments, the HEUR product particles that may be about 50 to 2000 microns in size can be added directly into the grind stage of a paint or coating formulation process as a 100% active solid powder to function as a rheology modifier. Neither the water solvation embodiment nor the 100% active solid powder embodiment require stripping of an organic solvent before addition to a paint formulation as is necessary for HEURs produced by conventional means. This saves valuable time in processing. Additionally, the powder form of the polymer can more easily and cost-effectively be shipped without the weight, volume, or risks of storage in solution. Finally, no azeotripic VOC remains, and thus the inventive HEURs contribute less to the VOC of any paint to which they are added as compared to conventionally produced HEURs.

Selection of feed rates for reactive extrusion depends in large part on the reactant feeds selected and the attendant reaction kinetics and required residence times. Relative selection of feed rates may be optimized to tune continuous reaction characteristics and product composition and quality accordingly. In certain embodiments, feed rates are selected to ensure reactive conditions in the continuous reaction assembly meet the following relative molar equivalents of reactants: the ratio of isocyanate functional group from isocyanate functional material to alcohol end-group from polyether polyol may range from 1:1 to 2:1 equivalents, 1.3:1 to 1.9:1 equivalents, or 1.3:1 to 1.8:1 equivalents; and the ratio of isocyanate functional group from urethane prepolymer to alcohol or amine from hydrophobic modifier ranges from 1:1.5 to 1:5 equivalents, 1:2 to 1:4 equivalents, or is about 1:2 equivalents.

In exemplary embodiments, the continuous reaction assembly is a twin-screw extruder. The screws of the twin-screw extruder may be an intermeshed with wiping action between the screws. In certain embodiments in which the continuous reaction assembly is an extruder, the extruder has 8 to 12 zones, each of which can be controlled in a temperature range from 80 to 400 degrees C. via variable heat sources. The temperature profile of the extruder helps control the rheology of the melt as it proceeds through the extruder, remove any water brought into the system (helping prevent any unwanted side reactions), and the reaction rates in the extruder. The extruder may further incorporate dies, vacuum zones (to avoid unwanted side reactions), kneading blocks or other extruder modifications. The extruder may further be starved-fed such that not every portion of the extruder is full during reactive extrusion. Exemplary extruders may also be described by having a L/d measurement ratio of 40 or shorter. In further embodiments, L/d for the extruder may be from 20 to 40 or from 25 to 35.

In one embodiment in which the continuous reaction assembly is an extruder, the extruder is provided with three distinct mixing zones. The first is a vacuum seal zone (for removal of water) with two sets of 90-degree kneading blocks. The kneading blocks allow for filling of the extruder with polymer. Polyether polyol and isocyanate functional material feeds feed into this zone. A second zone immediately Downstream of this first zone includes 30-degree kneading blocks to provide the needed shear for proper mixing while minimizing leakage and backflow, providing for plug-flow-like conditions in which the initial, prepolymer condensation reaction is completed. The hydrophobic modifier feed feeds into a third zone, immediately Downstream from the second zone. Downstream of the feed entrance into this third zone are additional 30-degree kneading blocks, which are provided to generate shear to incorporate the hydrophobic modifier into the prepolymer and allow for the endcapping reaction. These blocks help maintain necessary shear and plug-flow-type conditions while minimizing backflow or leakage in the third zone. Solid polymer HEUR product exits the third zone and is cooled to be ground and processed by either solvation in water or as a 100% active solid as discussed above.

In one embodiment in which the continuous reaction assembly is an extruder, the extruder may rotate at a speed of 75 to 300 rpm, 100 to 275 rpm, 100 to 250 rpm, and preferably at 150 rpm. The rotation speed of the extruder may also change throughout the extrusion process.

In other embodiments, temperature, kneader orientation, kneader placement, feed placement, rotation speed, and various other properties and setups may be modified as needed within the ranges, specifications, sets of reactants, and configurations provided herein to tune the product composition and quality.

Terms and Terminology

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of," if used herein, followed by a plurality of members herein means one of the members, or a combination of more than one of the members. For example, the phrase "at least one of a first component and a second component" means in the present application: the first component, the second component, or the first component and the second component combined. Likewise, "at least one of a first component, a second component, and a third component" means in the present application: the first component, the second component, the third component, the first component and the second component, the first component and the third component, the second component and the third component, or the first component and the second component and the third component. Similar combinations of larger listings of components are also possible.

"Paint" as used herein refers to any mixture comprising different types of raw materials, each with its own function, which must be balanced to achieve the desired properties in the final product or film coating. The two primary functions of paint are decoration and protection. A paint may contain a solvent (which can include a volatile component derived from a petroleum distillate for a solvent-based paint, or a low VOC, or no-VOC, or water for a water-based paint), a Binder, a pigment, fillers (such as an extender or a plurality of extenders of different sizes) and an additive, which may impart different functionality to the paint or final coating. Embodiments may include a pigment cluster as a component thereof, optionally in combination with at least one of the solvent, Binder, pigment, filler and additive.

"Coatings" as used herein refer to compositions such as paint, stains, lacquers, etc.

"Additives" as used herein refer to a general category of components or other raw materials that may be added to the coatings herein to promote various properties. Examples include, but are not limited to, surfactants, defoamers, biocides, mildewcides, algaecides, thickeners, anti-settling agents, pH buffers, corrosion inhibitors, driers, and/or anti-skinning agents.

"Upstream" and "Downstream" are relative, opposite directions on a continuous axis with respect to a continuous reaction assembly or an extruder. "Upstream" refers to a location near or nearer an initial feed input along the barrel of an extruder relative to a Downstream location. "Downstream" refers to a location near or nearer an exit point of an extruder relative to an Upstream location.

"Volatile Organic Compound" or "VOC" generally refers to organic compounds that have a high vapor pressure at room temperature. In many cases, VOCs are compounds with a vapor pressure of greater than about 0.1 mm of Hg. VOC as reported herein is measured according to ASTM D2369-90 and is the weight of the VOC per volume of the coating solids in grams/L. As used herein, low VOC or substantially free of VOCs means less than about 50 g/L, in other approaches, less than about 10 g/L, in yet other approaches, less than about 5 g/L, and in yet other approaches, no VOCs.

As used herein, "without the need for," "without substantial levels of," "in the absence of," or "substantially free of organic solvent, co-solvents, and/or plasticizers" generally means the rheology modifier compositions herein have less than about 1 weight percent, in other approaches, less than about 0.5 weight percent, in other approaches, less than about 0.2 weight percent, and in yet other approaches, no co-solvents, plasticizer, and coalescent aids. Such levels refer to each component individually or various total combinations thereof.

As used herein, when a monomer or monomer mixture is described, this disclosure also refers to the associated monomer unit or repeating unit when polymerized and vice versa.

As used herein, potential "cosolvents" include, but are not limited to, acetone and butyl acetate. Coalescent aids or coalescing agents include, but are not limited to, ethylene glycol, ethylene glycol phenyl ether, propylene glycol, hexylene glycol, 2,2,4-trimethyl-1,3-pentanediol monoisobutyreate (Texanol), glycol ethers, mineral spirits, methyl carbitol, butyl carbitol, phithalates, adipates, and the like, and mixtures thereof. As mentioned above, substantially free of, in the absence of, or devoid of such components individually and in various combinations thereof generally means less than about 1 weight percent, in other approaches, less than about 0.5 weight percent, in other approaches, less than about 0.2 weight percent, and in yet other approaches, no co-solvents in a coating or paint.

Unless otherwise specified, all measurements herein are made at 23±1° C. and 50% relative humidity. All publications, patent applications, and issued patents mentioned herein are hereby incorporated in their entirety by reference. Citation of any reference is not an admission regarding any determination as to its availability as prior art to the claimed invention.

The dimensions and values disclosed herein are not to be understood as being strictly limited to the exact numerical values recited. Instead, unless otherwise specified, such as dimension is intended to mean both the recited value and a functionally equivalent range surrounding that value. All ranges noted are intended to mean any endpoint within that range. For example, a dimension disclosed as "40 mm" is intended to mean "about 40 mm".

Illustrative embodiments have been described, hereinabove. It will be apparent to those skilled in the art that the above devices and methods may incorporate changes and modifications without departing from the general scope of this disclosure. It is intended to include all such modifications and alterations within the scope of the present disclosure. Furthermore, to the extent that the term "includes" is used in either the detailed description or the claims, such term is intended to be inclusive in a manner similar to the term "comprising" as "comprising" is interpreted when employed as a transitional word in a claim.

Experimental

The following examples demonstrate the preparation of polymers and paint compositions such as those described hereinabove. The examples are intended to be representative of the polymers and compositions that can be made and are not intended to limit the scope of the present disclosure to the specific illustrative examples disclosed below. All percentages, ratios, and amounts in this disclosure are by weight unless otherwise specified.

Conventional HEUR Example

For purposes of comparison, a hydrophobically modified urethane was prepared via a traditional, batch reaction. This conventional HEUR was then characterized so that it could be compared to the HEURs produced according to Inventive Example 1, described below. To produce the conventional HEUR by a batch reaction, the following reactants were combined in a batch reactor in xylene solution in the sequence described below and in the amounts identified in the TABLE 1, below. References to samples produced according to this conventional, batch reaction are referred to herein as "Conventional HEUR."

TABLE 1

| Chemical | Trade Name | Weight % | Mol % |
|---|---|---|---|
| Polyethylene glycol | PEG-8000 | 92.54 | 21.78 |
| 4,4-Dicyclohexamethane diisocyanate | Desmodur-W ® | 5.37 | 40.42 |
| Dibutyltin dilaurate | DABCO T-12 ® | 0.04 | 0.11 |
| 1-Hexanol | Alfol 6 ® | 2.05 | 37.69 |

Wherein polyethylene glycol is a polyether polyol, 4,4-dicyclohexamethane diisocyanate is an isocyanate functional material, dibutyltin dilaurate (DBTDL) is a catalyst, and 1-hexanol is a hydrophobic modifier endcap.

The batch reaction was conducted in several steps. First, all water had to be removed from the PEG-8000, which is available in prill, flake and molten, and is hygroscopic. Water present during the batch reaction causes unwanted urea side reactions. To remove as much water as possible, the PEG-8000 was stored in a vacuum oven for 24 hours at 100° C. The PEG-8000 was then melted in xylene at 140° C. and the melt refluxed for 30 minutes using a decanter to remove any remaining water. The melt was then cooled to 75° C. and the Desmodur-W® added. The dibutyltin dilaurate catalyst was then added to start the reaction.

The reaction was then monitored for diisocyanate level for two hours. Samples were periodically taken from the reaction mixture, quenched with a 5% solution of dibutylamine in methanol to stop the reaction, and then the samples were evaluated by infrared spectroscopy and gel permeation chromatography. When the theoretical level of hydroxyl from the PEG-8000 was fully reacted with diisocyanate to form prepolymer, the 1-hexanol was added to end-cap the prepolymer. The prepolymer and 1-hexanol were allowed to react in xylene solution for one hour. A sample of the resulting resin was then taken and dibutylamine added. The sample was titrated with hydrochloric acid according to ASTM D2572-97 to further confirm all isocyanate was consumed.

The reaction product is then solvated in water and xylene stripped from the batch reaction system. To accomplish this, water and co-solvent (butyl carbitol, 20% by weight solution) were added to the batch reactor, and the system was brought to reflux temperature (reflux temperature for this step varies between 90° C. and 102° C. depending on the ratio of water to xylene). Distillate containing water and xylene was separated and the water phase returned to the reactor. This process was repeated and continued until xylene levels in the batch reactor were at less than 1% by weight. Xylene content for a process run according to this method was determined to be 0.26 wt % via gas chromatography analysis. A conventional HEUR, solvated in water/cosolvents, was thus obtained. This stripping process took approximately 18 hours.

TABLE 2, below, shows molecular weights of Conventional HEUR material measured by gel permeation chromatography of a 10 microliter samples taken after the batch reaction and stripping processes were complete.

TABLE 2

| Sample ID | $M_n$ | $M_w$ | MP | $M_z$ | Polydispersity |
|---|---|---|---|---|---|
| Conventional HEUR | 3471 | 26646 | 27099 | 40177 | 8.554 |

Inventive Example

Example compositions of the inventive HEURs were produced via reactive extrusion according to the extruder schematics shown in FIG. 1A-1C on a 24 mm, twin screw extruder with 10 temperature controlled zones and a die. Each of the 10 zones shown in FIGS. 1A-1C have a function. Only two unique functions were provided in this extruder configuration. Each zone either conveyed reactive extrusion mix or contained 30-degree kneading blocks (denoted "30° KB" in FIGS. 1A-1C). The extruder configuration shown in FIG. 1A produced samples labeled "HEUR A," the extruder configuration shown in FIG. 1B produced samples labeled "HEUR B," and the extruder configuration shown in FIG. 1C produced samples labeled "HEUR C."

Components fed to the extruder for each of FIGS. 1A-1C include the same components listed in TABLE 1, above. Feed rates of components were provided in accordance with the relationships provided below in TABLE 3. As shown in FIGS. 1A-1C and TABLE 4, PEG-8000 (the polyether polyol) entered in the first feed at Zone 1 for all extruder arrangements. Desmodur-W® (isocyanate functional material) and DBTDL (catalyst) entered in the second feed at Zone 5 for all extruder arrangements, and Alfol-6 (1-hexanol, hydrophobic modifier) entered in the third feed at Zone 7 for production of HEUR A and HEUR C and Zone 9 for production of HEUR B. Residence times for each extruder system setup provided in this example are also shown below in TABLE 3.

TABLE 3

| SAMPLE ID | Residence Time (min) | Rotation (rpm) | PEG-8000 Feed Condition | Des-W Isocyanate: PEG OH (mol) | Alfol-6 OH: Prepolymer Isocyanate (mol) | DBDTL Concentration (Mol % of all Feeds) |
|---|---|---|---|---|---|---|
| HEUR A | 2.5 | 150 | Flake | 1.86 | 2.02 | 0.50% |
| HEUR B | 2.5 | 150 | Flake | 1.86 | 2.02 | 0.50% |
| HEUR C | 2.5 | 150 | Melt | 1.85 | 2.03 | 0.50% |

TABLE 4

| SAMPLE ID | PEG-8000 Feed Zone | Des-W Feed Zone | Alfol 6 Feed Zone | DBDTL Feed Zone |
|---|---|---|---|---|
| HEUR A | 1 | 5 | 7 | 5 |
| HEUR B | 1 | 5 | 9 | 5 |
| HEUR C | 1 | 5 | 7 | 5 |

Temperature was varied across Zones and extruder arrangements as shown in FIGS. 1A-1C. Temperatures generally ranged from 80° C. to 120° C. at various Zones along each extruder arrangement. Temperature at the die of each extruder was kept at 100° C. or 105° C. depending on the extruder arrangement.

TABLE 5, below, shows molecular weights of HEUR material measured by gel permeation chromatography of 10 microliter samples taken at the extruder dies after 65 minutes of run time on the extruder.

TABLE 5

| Sample ID | $M_n$ | $M_w$ | MP | $M_z$ | Polydispersity |
|---|---|---|---|---|---|
| HEUR A | 3669 | 19929 | 14616 | 29421 | 5.432365 |
| HEUR B | 3658 | 20659 | 14771 | 31298 | 5.647520 |
| HEUR C | 4441 | 26398 | 26579 | 38840 | 5.825 |

HEURs A, B, and C were further each incorporated into different samples of the same type of commercially available paint and tested against a control rheology modifier, Acrysol™ RM-2020 (available from Dow Chemical, "RM-2020") for performance characteristics including heat stability, scrub resistance, and washability according to the following procedures and methods.

One gram each of example HEUR, A, B, and C, and 8 grams of a control rheology modifier RM-2020 were each added to one pint of the same, commercially available, interior, vinyl acrylic paint formulation on an equal solids basis across samples. Paint containing HEUR A is referred to below as Paint Sample A, paint containing HEUR B is referred to below as Paint Sample B, paint containing HEUR C is referred to below as Paint Sample C, and paint containing control rheology modifier RM-2020 is referred to below as Control Paint Sample.

Each paint sample was tested at room temperature for its in-can properties including viscosity and pH immediately after preparation of each sample and then at one and two weeks after preparing each sample. At one eighth the concentration, HEURs A, B, and C showed comparable effect on viscosity to control rheology modifier RM-2020. Results of viscosity and pH testing are shown below in TABLE 6.

TABLE 6

| Sample ID | KUa/diff | KUb/diff | pH |
|---|---|---|---|
| At Start | | | |
| Control Paint Sample | 10.67 | 112 | 8.46 |
| Paint Sample A | 10.53 | 111 | 8.80 |
| Paint Sample B | 10.53 | 111 | 8.80 |
| Paint Sample C | 10.53 | 112 | 8.89 |
| 1 Week Room Temp. | | | |
| Control Paint Sample | 124/+12 | 120/+8 | 8.34 |
| Paint Sample A | 128/+17 | 124/+13 | 8.31 |
| Paint Sample B | 128/+17 | 125/+14 | 8.68 |
| Paint Sample C | 128/+16 | 123/+11 | 8.71 |
| 2 Week Room Temp. | | | |
| Control Paint Sample | 123/+11 | 121/+9 | 8.13 |
| Paint Sample A | 124/+13 | 122/+11 | 8.40 |
| Paint Sample B | 124/+13 | 121/+10 | 8.46 |
| Paint Sample C | 124/+12 | 121/+9 | 8.33 |

Each paint sample was tested for scrub resistance according to ASTM D2486-17. Paint films were formed from paint samples using a 7 mil Dow film caster. TABLE 7, below shows the scrub test results for the samples.

TABLE 7

| Sample ID | Scrubs R/R |
|---|---|
| Control Paint Sample | 390 |
| Paint Sample A | 300 |
| Paint Sample B | 265 |
| Paint Sample C | 240 |

Each paint sample was also tested for washability according to a modified version of ASTM D4828-94. Washability scores were scaled 0 to 5 instead of 0 to 10 as in the ASTM D4828-94 (0 corresponding to 0 and 5 corresponding to 10). Paint films were formed from paint samples using a 7 mil Dow film caster. TABLE 8, below, shows the washability test results for the samples.

TABLE 8

| Sample ID | Lipstick | Mustard | Ketchup | Wine | Grapejuice | Crayon | Coffee | Tea | Pen | Pencil | Total |
|---|---|---|---|---|---|---|---|---|---|---|---|
| Control Paint Sample | 4 | 3 | 4 | 2 | 3 | 4 | 3 | 3 | 3 | 4 | 33 |
| Paint Sample A | 4 | 3 | 4 | 2 | 2 | 5 | 2 | 2 | 4 | 3 | 31 |
| Paint Sample B | 4 | 3 | 4 | 2 | 2 | 5 | 2 | 2 | 4 | 3 | 31 |
| Paint Sample C | 4 | 3 | 4 | 2 | 2 | 5 | 2 | 2 | 4 | 3 | 31 |

What is claimed is:

1. A method of production of a hydrophobically modified, urethane thickener, wherein the thickener is produced by a reactive extrusion process, wherein the extrusion process comprises:
    first, loading a polyether polyol feed comprising a polyethylene oxide into a twin-screw extruder, the extruder comprising a front end and a back end with an outlet at the back end, wherein the polyether polyol feed is loaded near the front end of the extruder, wherein the polyethylene oxide has a weight average molecular weight of 1,000 to 32,000,
    second, loading an isocyanate functional material feed comprising a diisocyanate into the extruder at a point along the extruder closer to the back end of the extruder than where the polyether polyol feed was loaded, wherein the diisocyanate has the formula OCN—R—NCO where R is arylene, alkylarylene, alkylene, cyclic, or a hydrocarbon group containing ester or ether linkages, and
    third, loading a hydrophobic modifier feed into the extruder at a point along the extruder closer to the back end of the extruder than where the polyether polyol and isocyanate functional material feeds were loaded, wherein the hydrophobic modifier feed comprises an aliphatic alcohol with 5 to 20 carbons;
    wherein either the polyether polyol feed, the isocyanate functional material feed, or both further comprise a metal catalyst for catalyzing a reaction between the polyethylene oxide and the isocyanate functional material;
    wherein the polyether polyol and isocyanate functional material feeds are placed close enough to the front of the extruder and the hydrophobic modifier feed is placed close enough to the back end of the extruder that when the combined polyether polyol and isocyanate functional material feeds reach the hydrophobic modifier feed in the extruder, the polyethylene oxide and diisocyanate have fully reacted;
    wherein the hydrophobic modifier feed is located close enough to the front end of the extruder and far enough away from the extruder outlet to allow the combined polyether polyol feed, isocyanate functional material, and hydrophobic modifier feeds to react fully prior to reaching the extruder outlet, forming a hydrophobically modified urethane thickener and
    wherein the extruder temperature is maintained at 80° C. to 140° C. from the front end to the back end of the extruder, and different temperatures may be maintained at different locations along the extruder from the front end to the back end; and
    wherein the residence time for the extruder is one to five minutes.

2. The method of production of a hydrophobically modified, urethane thickener of claim 1, wherein after loading the hydrophobic modifier feed, fourth, cooling the hydrophobically modified urethane thickener as it exits the extruder to yield a solid, reactive-extruded hydrophobically modified urethane thickener.

3. The method of production of a hydrophobically modified, urethane thickener of claim 2, wherein after cooling the hydrophobically modified urethane thickener, fifth, grinding the solid, reactive-extruded hydrophobically modified urethane thickener to a powder of 50 to 2000 microns in size.

4. The method of production of a hydrophobically modified, urethane thickener of claim 3, wherein after grinding the solid reactive-extruded hydrophobically modified urethane thickener, sixth, solvating the reactive-extruded hydrophobically modified urethane thickener powder with water to form a solution comprising 20% to 25% by weight reactive-extruded hydrophobically modified urethane thickener.

5. The method of production of a hydrophobically modified, urethane thickener of claim 1, wherein the extruder further comprises kneading blocks that mix and apply shear to the contents of the extruder.

6. A method of production of a paint composition using a 100% active solids hydrophobically modified urethane thickener, comprising:
    first, loading a polyether polyol feed comprising a polyethylene oxide into a twin-screw extruder, the extruder comprising a front end and a back end with an outlet at the back end, wherein the polyether polyol feed is loaded near the front end of the extruder, wherein the polyethylene oxide has a weight average molecular weight of 1,000 to 32,000,
    second, loading an isocyanate functional material feed comprising a diisocyanate into the extruder at a point along the extruder closer to the back end of the extruder than where the polyether polyol feed was loaded, wherein the diisocyanate has the formula OCN—R—NCO where R is arylene, alkylarylene, alkylene, cyclic, or a hydrocarbon group containing ester or ether linkages,
    third, loading a hydrophobic modifier feed into the extruder at a point along the extruder closer to the back end of the extruder than where the polyether polyol and isocyanate functional material feeds were loaded, wherein the hydrophobic modifier feed comprises an aliphatic alcohol with 5 to 20 carbons,
    fourth, cooling a reaction mix created by the combination of the polyether polyol, isocyanate functional material, and hydrophobic modifier feeds as it exits the extruder at the outlet to yield a solid, reactive-extruded hydrophobically modified urethane thickener, fifth, grinding the solid, reactive-extruded hydrophobically modified urethane thickener to a powder of 50 to 2000 microns in size, and sixth, adding the solid, reactive-extruded hydrophobically modified urethane thickener powder directly to a grind stage of a paint production process as needed to modify the rheology of a resulting paint;

wherein either the polyether polyol feed, the isocyanate functional material feed, or both further comprise a metal catalyst for catalyzing a reaction between the polyether polyol and the isocyanate functional material;

wherein the polyether polyol and isocyanate functional material feeds are placed close enough to the front of the extruder and the hydrophobic modifier feed is placed close enough to the back end of the extruder that when the combined polyether polyol and isocyanate functional material feeds reach the hydrophobic modifier feed in the extruder, the polyether polyol and isocyanate functional material have fully reacted;

wherein the hydrophobic modifier feed is located close enough to the front end of the extruder and far enough away from the extruder outlet to allow the combined polyether polyol, isocyanate functional material, and hydrophobic modifier feeds to react fully, forming a hydrophobically modified urethane thickener before the reaction mix reaches the outlet; and wherein the extruder temperature is maintained at 80° C. to 140° C. from the front end to the back end of the extruder, and different temperatures may be maintained at different locations along the extruder from the front end to the back end; and wherein the residence time for the extruder is one to five minutes.

* * * * *